United States Patent
Kujawski

(10) Patent No.: US 10,528,759 B2
(45) Date of Patent: Jan. 7, 2020

(54) APPLICATION PROGRAMMING INTERFACE BRIDGE FOR TRANSPORTING A LOCAL REQUEST FROM A LOCAL CLIENT SYSTEM TO A TARGET SERVER SYSTEM, AND METHOD THEREOF

(71) Applicant: Aagey Holding, LLC, Atlanta, GA (US)

(72) Inventor: Edward T. Kujawski, Alpharetta, GA (US)

(73) Assignee: Aagey Holding, LLC, Atlanta, GA (US)

( * ) Notice: Subject to any disclaimer, the term of this patent is extended or adjusted under 35 U.S.C. 154(b) by 185 days.

(21) Appl. No.: 15/786,544

(22) Filed: Oct. 17, 2017

(65) Prior Publication Data
US 2019/0114442 A1    Apr. 18, 2019

(51) Int. Cl.
| H04L 29/06 | (2006.01) |
| G06F 21/62 | (2013.01) |
| G06F 9/54 | (2006.01) |
| G06F 9/50 | (2006.01) |

(52) U.S. Cl.
CPC ........ *G06F 21/6245* (2013.01); *G06F 9/5038* (2013.01); *G06F 9/545* (2013.01); *G06F 9/547* (2013.01)

(58) Field of Classification Search
CPC .................................. G06F 9/00; H04L 12/00
See application file for complete search history.

(56) References Cited

U.S. PATENT DOCUMENTS

| 6,236,997 | B1 | 5/2001 | Bodamer et al. |
| 7,051,068 | B1 | 5/2006 | Kawase et al. |
| 7,584,241 | B2 | 9/2009 | Kuresky et al. |
| 7,685,235 | B2 | 3/2010 | Curran et al. |
| 8,234,372 | B2 | 7/2012 | Knapp et al. |
| 8,386,309 | B2 | 2/2013 | Thibedeau et al. |
| 8,719,223 | B2 | 5/2014 | Knapp et al. |
| 8,887,182 | B2 | 11/2014 | Low et al. |
| 8,910,184 | B2 | 12/2014 | Dixon et al. |
| 8,910,185 | B2 | 12/2014 | Dixon et al. |
| 9,098,855 | B2 | 8/2015 | Thibedeau et al. |
| 2007/0027904 | A1 | 2/2007 | Chow et al. |

(Continued)

OTHER PUBLICATIONS

Fleurey et al., "MDE to manage communications with and between resource-constrained systems", Lecture Notes in Computer Science (Jan. 2011), International Conference on Model Driven Engineering Languages and Systems, retrieved from <http://www.fleurey.com/franck/uploads/Main/Models2011a.pdf>.

*Primary Examiner* — Joseph P Hirl
*Assistant Examiner* — Leynna Truvan
(74) *Attorney, Agent, or Firm* — Jeffrey C. Watson; Mathew L. Grell; Grell & Watson Patent Attorneys LLC

(57) ABSTRACT

An API bridge is for transporting a local API request from a local client system to a target server system. The API bridge includes a local API bridge in communication with the local client system, and a remote API bridge in communication with the target server system. The local API bridge is configured to receive the local API request from the local client system and create a first message to be sent to the remote API bridge. The remote API bridge is configured to receive the first message created by the local API bridge and call the target server system with a target API request.

13 Claims, 2 Drawing Sheets

(56) References Cited

U.S. PATENT DOCUMENTS

| | | |
|---|---|---|
| 2012/0276880 A1 | 11/2012 | Angom et al. |
| 2013/0086148 A1 | 4/2013 | Little et al. |
| 2013/0275197 A1 | 10/2013 | Thibedeau et al. |
| 2014/0019951 A1 | 1/2014 | Petrova |
| 2014/0249938 A1 | 9/2014 | Garrett et al. |
| 2015/0074183 A1 | 3/2015 | Clothier et al. |
| 2015/0120729 A1 | 4/2015 | Slade |
| 2016/0154794 A1 | 6/2016 | Knapp et al. |
| 2016/0188742 A1 | 6/2016 | Ingvoldstad et al. |
| 2016/0301735 A1 | 10/2016 | Lind |
| 2016/0328577 A1* | 11/2016 | Howley .................. G06F 19/00 |
| 2016/0371102 A1 | 12/2016 | Kim et al. |
| 2017/0046379 A1 | 2/2017 | Thacker et al. |
| 2017/0083970 A1 | 3/2017 | Reckert et al. |

* cited by examiner

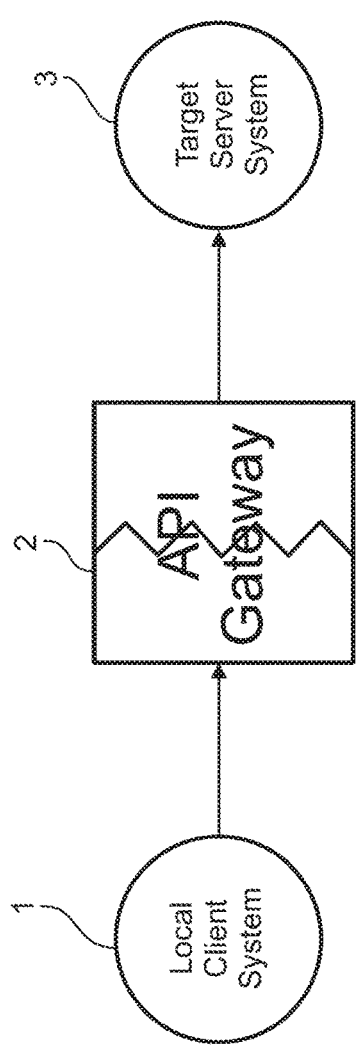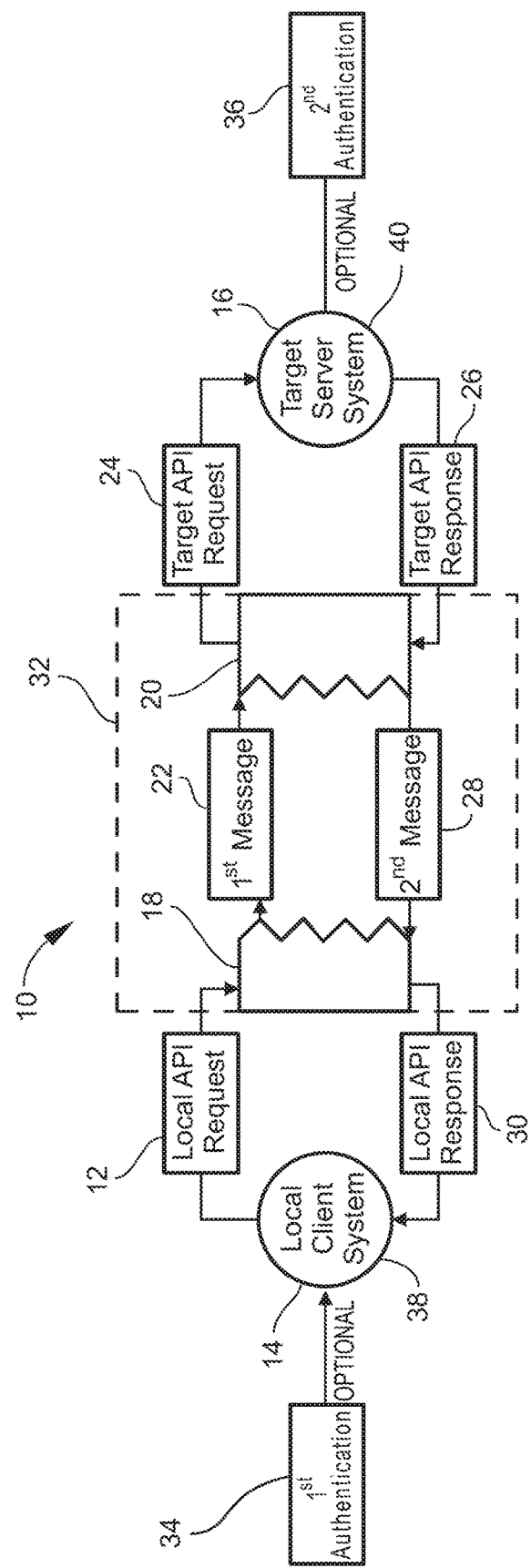

APPLICATION PROGRAMMING INTERFACE BRIDGE FOR TRANSPORTING A LOCAL REQUEST FROM A LOCAL CLIENT SYSTEM TO A TARGET SERVER SYSTEM, AND METHOD THEREOF

FIELD OF THE INVENTION

The present disclosure generally relates to web resource calls or requests, of all variations, between a local client and a target server utilizing an application programming interface ("API") bridge for transporting the call or request from the client system to the server. More specifically, the present disclosure relates to web resource calls or requests utilizing an API bridge for transporting the request from the local client system to the target server when the client and the server are geographically and topologically separated.

BACKGROUND

In computer programming, an Application Programming Interface (hereinafter "API") is a set of subroutine definitions, protocols, and tools for building application software. In general terms, it is a set of clearly defined methods of communication between various software components. A good API makes it easier to develop a computer program by providing all the building blocks, which are then put together by the programmer. An API may be for a web-based system, operating system, database system, computer hardware or software library. An API specification can take many forms, but often includes specifications for routines, data structures, object classes, variables or remote calls. POSIX, Microsoft Windows API, the C++ Standard Template Library and Java APIs are examples of different forms of APIs. Documentation for the API is usually provided to facilitate usage.

An application server is a software framework that provides both facilities to create web applications and a server environment to run them. Application Server Frameworks contain a comprehensive service layer model. An application server acts as a set of components accessible to the software developer through an API defined by the platform itself. For Web applications, these components are usually performed in the same running environment as their web server(s), and their main job is to support the construction of dynamic pages. However, many application servers target much more than just Web page generation: they implement services like clustering, fail-over, and load-balancing, so developers can focus on implementing the business logic. In the case of Java application servers, the server behaves like an extended virtual machine for running applications, transparently handling connections to the database on one side, and, often, connections to the Web client on the other.

Existing applications may already have HTTP/HTTPS interfaces with their clients, but due to policy, security, or architectural requirements (like in health care or other similar industries) the application server cannot be made available on the internet. However, the internet, as commonly used, may separate offices or branches between the client and the server. As such, in communicating between various computers, servers, etc., when sending web resource calls or requests, the client and the server may be geographically and topologically separated in many situations, like in the health care or similar industries.

Currently, the only option is a virtual private network ("VPN") that will tunnel all the traffic between the client and server, but for policy, security, or architectural requirements, a VPN may not be possible, like in health care or other similar industries.

Therefore, a need exists for an apparatus or method for sending and receiving web resource calls or request when the client and the server are geographically and topologically separated.

The instant disclosure of an API bridge for transporting a request from a client system to a server system, and method thereof, may be designed to address at least some of the issues discussed above.

SUMMARY

Briefly described, in a possibly preferred embodiment, the present disclosure overcomes the above-mentioned disadvantages and meets the recognized need for such an apparatus or method by providing of an API bridge for transporting a local API request from a local client system to a target server system, and method thereof. The API bridge may generally include a local API bridge in communication with the local client system, and a remote API bridge in communication with the target server system. The local API bridge may be configured to receive a local API request from the local client system and create a first message to be sent to the remote API bridge. The remote API bridge may be configured to receive the first message created by the local API bridge and call the target server system with a target API request.

In select embodiments, when the target server system responds to the target API request from the remote API bridge with a target API response, the remote API bridge may be configured to create a second message with the target API response. Wherein, the local API bridge may be configured to receive the second message created by the remote API bridge and respond to the local client system with a local API response having content of the target API response.

One feature of the instant API bridge may be that the first message created by the local API bridge and the second message created by the remote API bridge may be packaged and sent via a messaging system.

Another feature of the instant API bridge may be that the local client system may not receive a response from the target server system until the local API bridge receives the second message from the remote API bridge.

Another feature of the instant API bridge may be that the API bridge may be configured to cross the internet.

Another feature of the instant API bridge may be that it may be configured to change authentication methods of the local API request. In select embodiments, the local API bridge may be configured to use a first authentication (i.e. single sign on ("SSO"), HTTP Basic, HTTP Digest, HTTP Client Certificat, OAuth, the like, etc.) for the local client system, while the remote API bridge may be configured to use a second authentication (i.e. SSO, HTTP Basic, HTTP Digest, HTTP Client Certificat, OAuth, the like, etc.) for the target server system.

Another feature of the instant API bridge may be that the API bridge may be configured for support of the local client system and the target server system without any code changes. In select embodiments, the API bridge may be configured with the ability to use existing API and protocols of the local client system and the target server system. As such, another feature of the instant API bridge may be that the API bridge may be configured for use with an existing local client system and an existing target server system without any change to code on the existing local client system and the existing target server system.

Another feature of the instant API bridge may be that the API bridge may be configured to support all future requests over HTTP or HTTPS. In select embodiments, the API bridge may be configured to not interpret content of the HTTP body, and pass the HTTP body without change to the target server system, whereby all future API protocols that use HTTP or HTTPS may be supported.

Another feature of the instant API bridge may be that the API bridge may be configured to permit access to only the target server system with a secure configuration.

Another feature of the instant API bridge may be that the API bridge may be configured to transmit information between different enterprise LANs while offering the ability to change authentication methods. In select embodiments, the API bridge may be configured to deploy the local API bridge and the remote API bridge in different enterprises. In select embodiments, the different enterprises may share API resources without using a VPN or exporting the API resource to the internet.

Another feature of the instant API bridge may be that the connectivity between the local API bridge and the remote API bridge may be encrypted for security. In select embodiments, the API bridge may be configured for allowing the local client system and the server system to use an insecure version of HTTP, like when a local client system connects to an API Bridge, or an API Bridge connects to a target server.

Another feature of the instant API bridge may be that the API bridge may be configured to monitor the API calls between the local client system and the target server system. In select embodiments, this monitoring may be to identify if the local client system and the target server system are operating properly, or to identify if there is unwanted activity.

Another feature of the instant API bridge may be that the API bridge may be configured to forward the API request when both the local API bridge and the remote API bridge are behind one or more firewall(s) without any available open ports.

In another aspect, the instant disclosure provides for a method for transporting an API request from a local client system to a target server system. The instant method may generally include providing the API bridge in any of the embodiments shown and/or described herein. As such, the API bridge provided in the instant method may generally include the local API bridge in communication with the local client system, and the remote API bridge in communication with the target server system. The instant method may then include the steps of: receiving a local API request from the local client system via the local API bridge; creating a first message to be sent to the remote API bridge via the API bridge; receiving the first message created by the local API bridge via the remote API bridge; and calling the target server system with a target API request via the remote API bridge.

In select embodiments, the method for transporting a local API request from a local client system to a target server system may include: the target server system responding to the target API request from the remote API bridge with a target API response; creating a second message with the target API response via the remote API bridge; receiving the second message created by the remote API bridge via the local API bridge; and responding to the local client system with a local API response having content of the target API response via the local API bridge.

One feature of the instant method for transporting a local API request from a local client system to a target server system may be that the first message created by the local API bridge and the second message created by the remote API bridge may be packaged and sent via a messaging system.

Another feature of the instant method for transporting a local API request from a local client system to a target server system may be that the local client system may not receive the local API response from the target server system until the local API bridge receives the second message from the remote API bridge.

Another feature of the instant method for transporting a local API request from a local client system to a target server system may be that the API bridge may be configured to cross the internet.

Another feature of the instant method for transporting a local API request from a local client system to a target server system may be that the API bridge may be configured to change authentication methods of the local API request. In select embodiments, the local API bridge may be configured to use a first authentication (like SSO, HTTP Basic, HTTP Digest, HTTP Client Certificat, OAuth, the like, etc.) for the local client system, while the remote API bridge is configured to use a second authentication (like SSO, HTTP Basic, HTTP Digest, HTTP Client Certificat, OAuth, the like, etc.) for the target server system.

Another feature of the instant method for transporting a local API request from a local client system to a target server system may be that the API bridge may be configured for support of the local client system and the target server system without any code changes. In select embodiments, the API bridge may be configured with the ability to use existing API and protocols of both the local client system and the target server system.

Another feature of the instant method for transporting a local API request from a local client system to a target server system may be that the API bridge may be configured to support all future requests over HTTP or HTTPS. In select embodiments, the API bridge may be configured to not interpret content of the HTTP body, and pass the HTTP body without change to the target server system, whereby all future API protocols that use HTTP or HTTPS may be supported.

Another feature of the instant method for transporting a local API request from a local client system to a target server system may be that the API bridge may be configured for use with an existing local client system and a target server system without any change to code on the existing local client system and the existing target server system.

Another feature of the instant method for transporting a local API request from a local client system to a target server system may be that the API bridge may be configured to permit access to only the target server system with a secure configuration.

Another feature of the instant method for transporting a local API request from a local client system to a target server system may be that the API bridge may be configured to transmit information between different enterprise LANs while offering the ability to change authentication methods. In select embodiments, the API bridge may be configured to deploy the local API bridge and the remote API bridge in different enterprises. In select embodiments, the different enterprises may share API resources without using a VPN or exporting the API resource to the internet.

Another feature of the instant method for transporting a local API request from a local client system to a target server system may be that the connectivity between the local API bridge and the remote API bridge may be encrypted for security. In select embodiments, the API bridge may be configured for allowing the local client system and the target server system to use an insecure version of HTTP, like when a local client system connects to an API Bridge, or an API Bridge connects to a target server.

Another feature of the instant method for transporting a local API request from a local client system to a target server system may be that the API bridge may be configured to monitor the API calls between the local client system and the target server system. In select embodiments, this monitoring may be to identify if the local client system and the target server system are operating properly, or to identify if there is unwanted activity.

Another feature of the instant method for transporting a local API request from a local client system to a target server system may be that the API bridge may be configured to forward the API request when both the local API bridge and the remote API bridge are behind one or more firewall(s) without any available open ports.

The foregoing illustrative summary, as well as other exemplary objectives and/or advantages of the disclosure, and the manner in which the same are accomplished, may become more apparent to one skilled in the art from the prior Summary, and the following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which:

FIG. 1 shows a diagram of an existing API gateway topology according to the Prior Art.

FIG. 2 shows a diagram of the instant API bridge for transporting a local API request from a local client system to a target server system according to select embodiments of the instant disclosure.

Figure 3:
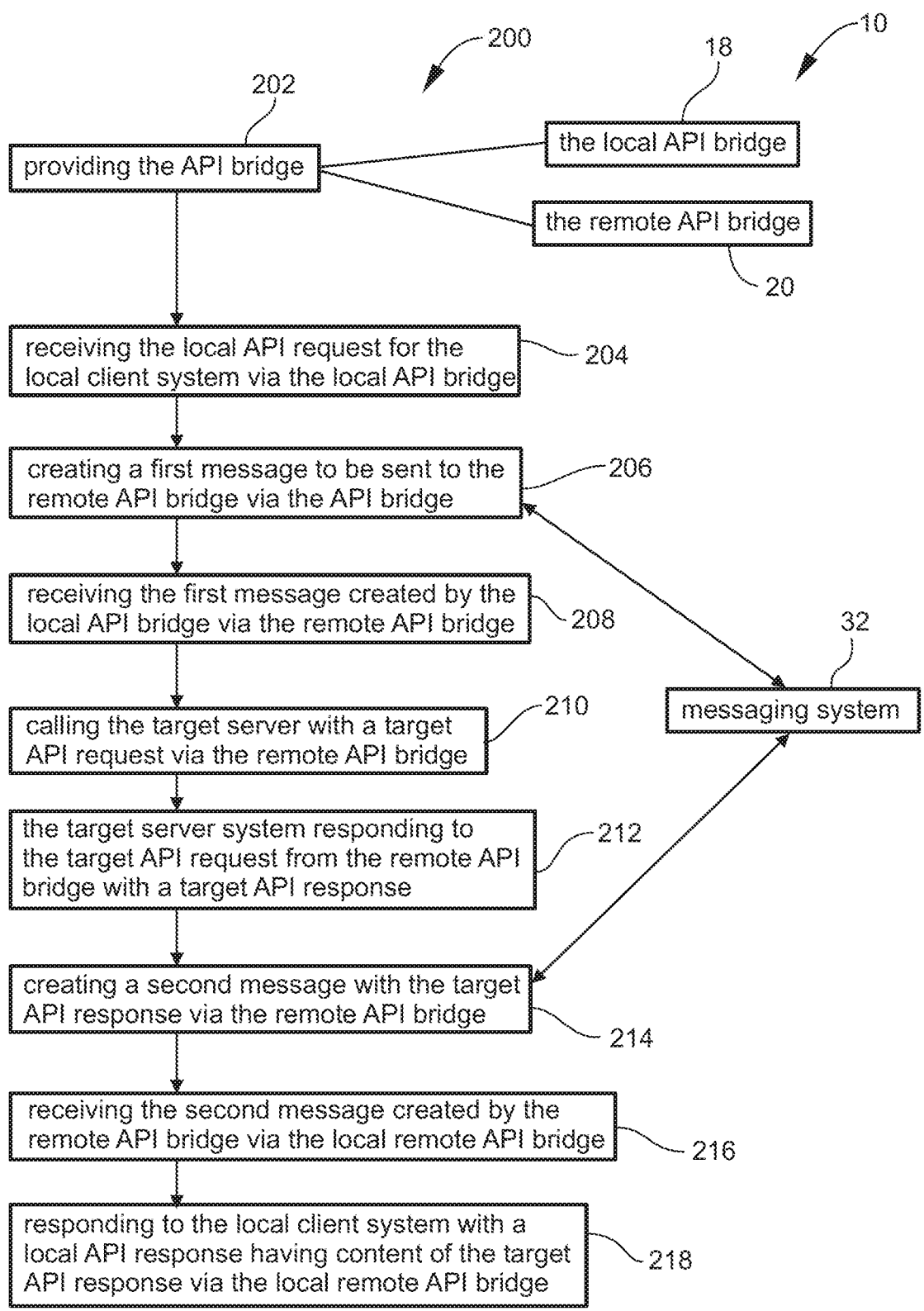
FIG. 3 shows a flow chart of the instant method for transporting a local API request from a local client system to a target server system according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring first to FIG. 1, an existing API gateway 2 topology is shown according to the prior art. As shown, prior to the instant disclosure the local client system 1 communicates with the target server system 3 directly through API gateway 2. In a communications network, the term gateway refers to a piece of networking hardware that includes a network node equipped for interfacing with another network that uses different protocols. In the network for an enterprise, a computer server acting as a gateway node is often also acting as a proxy server and a firewall server. A gateway is often associated with both a router, which knows where to direct a given packet of data that arrives at the gateway, and a switch, which furnishes the actual path in and out of the gateway for a given packet. A gateway may contain devices such as protocol translators, impedance matching devices, rate converters, fault isolators, or signal translators as necessary to provide system interoperability. Gateways, also called protocol converters, can operate at any network layer. The activities of a gateway are more complex than that of the router or switch as it communicates using the application layer of the Open Systems Interconnection model.

However, gateways also require the establishment of mutually acceptable administrative procedures between both networks. Existing applications may already have HTTP/HTTPS interfaces with their clients, but due to policy, security, or architectural requirements the application server cannot be made available on the internet. But, the internet may separate offices or branches between the client and server. Currently the only option is a VPN that will tunnel all the traffic between the client and server, but for policy, security, or architectural requirements a VPN is not possible. Additionally, the authentication method available on the server may not be supported on the client.

The instant disclosure may be designed to provide an API (like HTTP/HTTPS) Bridge. This will accept requests on one server and, without answering the request initially, forward the request to the destination server. Once the response is available from the destination server, that response may be sent back to the originating client. The API Bridge will permit connectivity between applications in different offices without the need for a VPN, even when the application server cannot be made available on the internet because of policy, security, and/or architectural requirements.

Referring now to FIGS. 2-3, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Briefly described, in a possibly preferred embodiment, the present disclosure overcomes the above-mentioned disadvantages and meets the recognized need for such an apparatus or method by providing of an API bridge 10 (see FIG. 2) for transporting local API request 12 from local client system 14 to target server system 16, and method 200 thereof (see FIG. 3).

Referring specifically to FIG. 2, the API bridge 10 may generally include local API bridge 18 in communication with the local client system 14, and remote API bridge 20 in communication with target server system 16. The components of API bridge 10, like the local API bridge 18, the remote API bridge, the local client system, and the target server system, may be any computers, hardware, tangible medium, processors, drives, software, devices, the like, etc. configured for transporting local API request 12 from local client system 14 to target server system 16, as shown and/or described herein. The local API bridge 18 may be configured to receive local API request 12 from local client system 14 and create first message 22 to be sent to remote API bridge 20. The remote API bridge 20 may be configured to receive first message 22 created by local API bridge 18 and call target server system 16 with target API request 24.

In select embodiments, when target server system 16 responds to the target API request 24 from the remote API bridge 20 with target API response 26, the remote API bridge 20 may be configured to create second message 28 with the target API response 26. Wherein, the local API bridge 18 may be configured to receive the second message 28 created by the remote API bridge 20 and respond to the local client system 14 with local API response 30 having content of the target API response 26.

Messaging system 32 may be included in API bridge. Messaging system 32 may be for creating first message 22 with local API bridge 18 and/or second message 28 with remote API bridge 20. Messaging system 32 may include any software or devices for creating first message 22 and/or second message 28 and can include any desired security or encryption. One feature of the instant API bridge 10 may be that the first message 22 created by the local API bridge 18 and the second message 28 created by the remote API bridge 20 may be packaged and sent via messaging system 32. Messaging system 32 may allow for converting messages from the API of local client system 14 to the API of the target server system 16, and vice versa. Utilizing API bridge 10 with messaging system 32, another feature of the instant API bridge 10 may be that the local client system 14 may not receive a response from the target server system 16 until the local API bridge 18 receives the second message 28 from the remote API bridge 20.

API bridge 10 may be configured to cross the internet. This feature may allow for communication between local client system 14 and target server system 16 in different geographical locations.

In select embodiments, API bridge 10 may be optionally configured to change authentication methods of the local API request 12. As an example, and clearly not limited thereto, local API bridge 18 may be optionally configured to use first authentication 34 for the local client system 14, while remote API bridge 20 may be configured to use second authentication 36 for the target server system 16. First authentication 34 and second authentication 36 may be any authentication methods, including, but not limited to, SSO, HTTP Basic, HTTP Digest, HTTP Client Certificat, OAuth, the like, etc.

In select embodiments, API bridge 10 may be configured for support of local client system 14 and target server system 16 without any code changes. As an example, and clearly not limited thereto, API bridge 10 may be configured with the ability to use or utilize existing API and protocols of both the local client system 14 and the target server system 16.

In select embodiments, API bridge 10 may be configured to support all future requests over HTTP or HTTPS. In select embodiments, as examples, and clearly not limited thereto, API bridge 10 may be configured to not interpret content of the HTTP body, and pass the HTTP body without change to the target server system 16, whereby all future API protocols that use HTTP or HTTPS may be supported.

In select embodiments, API bridge 10 may be configured for use with an existing local client system 38 and/or an existing target server system 40. This may include, but is not limited to, use without any change to code on the existing local client system 38 and existing target server system 40.

In select embodiments, API bridge 10 may be optionally configured to permit access to only the target server system 16 with a secure configuration.

In select embodiments, API bridge 10 may be optionally configured to transmit information between different enterprise LANs while offering the ability to change authentication methods. As examples, and clearly not limited thereto, the API bridge 10 may be configured to deploy the local API bridge 18 and the remote API bridge 20 in different enterprises. In select embodiments, the different enterprises may share API resources without using a VPN or exporting the API resource to the internet.

In select embodiments, API bridge 10 may include encrypted connectivity between local API bridge 18 and remote API bridge 20 for security. As an example, and clearly not limited thereto, in select embodiments API bridge 10 may be configured for allowing the local client system 14 and the target server system 16 to use an insecure version of HTTP. As examples, and clearly not limited thereto, when local client system 14 connects to API Bridge 10, or API Bridge 10 connects to target server system 16, API bridge 10 may be configured to use an insecure version of HTTP.

In select embodiments, API bridge 10 may be configured to monitor the API calls between local client system 14 and target server system 16. As examples, and clearly not limited thereto, in select embodiments, this monitoring may be to identify if the local client system 14 and the target server system 16 are operating properly, or to identify if there is unwanted activity.

In select embodiments, API bridge 10 may be configured to forward, process, and respond to the local API request 12 when both the local API bridge 18 and the remote API bridge 20 are behind one or more firewall(s) without any available open ports.

Referring now to FIG. 3, method 200 is shown. Method 200 may be for transporting local API request 12 from local client system 14 to target server system 16. Method 200 may generally include step 202 of providing or utilizing API bridge 10 in any of the embodiments shown and/or described herein. As such, API bridge 10 may be provided in method 200 with local API bridge 18 in communication with local client system 14, and remote API bridge 20 in communication with target server system 16. Method 200 may then include the steps of: step 204 of receiving local API request 12 from local client system 14 via local API bridge 18; step 206 of creating first message 22 to be sent to remote API bridge 20 via API bridge 10; step 208 of receiving first message 22 created by local API bridge 18 via remote API bridge 20; and step 210 of calling target server system 16 with target API request 24 via remote API bridge 20.

In select embodiments, method 200 for transporting local API request 12 from local client system 14 to target server system 16 may include: step 212 of the target server system 16 responding to the target API request 24 from remote API bridge 20 with target API response 26; step 214 of creating second message 28 with target API response 26 via remote API bridge 20; step 216 of receiving second message 28 created by remote API bridge 20 via local API bridge 18; and step 218 of responding to local client system 14 with local API response 30 having content of the target API response 26 via local API bridge 18.

One feature of the method 200 for transporting local API request 12 from local client system 14 to target server system 16 may be that first message 22 created by local API bridge 18 and/or second message 28 created by remote API bridge 20 may be packaged and sent via messaging system 32.

Another feature of method 200 for transporting local API request 12 from local client system 14 to target server system 16 may be that local client system 14 may not receive the local API response 30 from the target server system 16 until local API bridge 18 receives second message 28 from remote API bridge 20.

Another feature of method 200 for transporting local API request 12 from local client system 14 to target server system 16 may be that the messaging system 32 of API bridge 10 may be configured to cross the internet.

In select embodiments of method 200 for transporting local API request 12 from local client system 14 to target server system 16, API bridge 10 may be configured to change authentication methods of local API request 12. As examples, and clearly not limited thereto, in select embodiments, local API bridge 18 may be configured in method 200 to use first authentication 34 for local client system 14, while remote API bridge 20 may be configured to use second authentication 36 for target server system 16.

In select embodiments of method 200 for transporting local API request 12 from local client system 14 to target server system 16, API bridge 10 may be configured for support of local client system 14 and target server system 16 without any code changes. As examples, and clearly not limited thereto, in select embodiments, API bridge 10 may be configured in method 200 with the ability to use existing API and protocols of both the local client system 14 and the target server system 16.

In select embodiments of method 200 for transporting local API request 12 from local client system 14 to target server system 16, API bridge 10 may be configured to support all future requests over HTTP or HTTPS. As examples, and clearly not limited thereto, in select embodiments, API bridge 10 may be configured in method 200 to not interpret content of the HTTP body, and pass the HTTP body without change to the target server system 16, whereby all future API protocols that use HTTP or HTTPS may be supported.

In select embodiments of method 200 for transporting local API request 12 from local client system 14 to target server system 16, API bridge 10 may be configured for use with existing local client system 38 and/or existing target server system 40 without any change to code on the existing local client system 38 and/or the existing target server system 40.

In select embodiments of method 200 for transporting local API request 12 from local client system 14 to target server system 16, API bridge 10 may be configured to permit access to only the target server system 16 with a secure configuration.

In select embodiments of method 200 for transporting local API request 12 from local client system 14 to target server system 16, API bridge 10 may be configured to transmit information between different enterprise LANs while offering the ability to change authentication methods. As examples, and clearly not limited thereto, in select embodiments API bridge 10 may be configured in method 200 to deploy local API bridge 18 and remote API bridge 20 in different enterprises. The different enterprises may share API resources without using a VPN or exporting the API resource to the internet.

In select embodiments of method 200 for transporting local API request 12 from local client system 14 to target server system 16, connectivity between local API bridge 18 and remote API bridge 20 may be encrypted for security. As examples, and clearly not limited thereto, in select embodiments, API bridge 10 may be configured in method 200 for allowing local client system 14 and target server system 16 to use an insecure version of HTTP, when local client system 14 connects to API Bridge 10, or API Bridge 10 connects to target server system 16.

In select embodiments of method 200 for transporting local API request 12 from local client system 14 to target server system 16, API bridge 10 may be configured to monitor the API calls between the local client system 14 and the target server system 16. As examples, and clearly not limited thereto, in select embodiments, this monitoring may be to identify if the local client system 14 and the target server system 16 are operating properly, or to identify if there is unwanted activity.

In select embodiments of method 200 for transporting local API request 12 from local client system 14 to target server system 16, API bridge 10 may be configured to forward the local API request 12 when both the local API bridge 18 and the remote API bridge 20 are behind one or more firewall(s) without any available open ports.

Given that existing software installed on a client could communicate with a server using the HTTP protocol, but is unable to due to network connectivity issues, the instant disclosure may be designed to permit the local client system 14 and target server system 16 to communicate. No software reprogramming may be necessary on the local client system 14 and/or target server system 16 to use API Bridge 10 of the instant disclosure, only configuration of local client system 14.

The instant disclosure may also permit the changing of the authentication methods, so the local client system 14 may want to authenticate with the HTTP BASIC method, but the target server system 16 only support TLS client authentication protocol.

Because the instant system may be built upon messaging system 32, the API bridge 10 can be used to interface clients or servers without either requiring code changes. Unmodified client to unmodified server will allow for the API to be available when otherwise not, and will allow for the monitoring of the API calls. Unmodified client to message system client, provides a way to integrate existing clients with new message system client, allowing for a transition time when moving to new message system. Message system client to unmodified server, provides a way to integrate existing servers with new message system clients, allowing for a transition time when moving to a new message system.

A new capability with API Bridge 10 may permit new and unique installations of networked clients and servers that have flexibility and advantages not previously seen.

As such, the instant disclosure embraces a method, computer readable medium, and apparatus for transporting a request from a client system to a server system when the client and server are geographically and topologically separated. Systems previously not able to communicate due to connectivity problems, will now communicate in real time. No adjustments to the software on the client and server are required when utilizing the instant disclosure. This may be especially beneficial when network topology requires special rules for the client and the server to interoperate.

As such, the present disclosure embraces method 200 to transmit an HTTP request between servers, located in different locations, via API bridge 10. Method 200 could transmit an API from a client to the API bridge 10 then to the server. The API Bridge 10 could cross the internet and the API request could change the authentication methods. Support of the API bridge 10 could be available to the client and the target server without any code changes.

In sum, the instant disclosure is designed to transmit the API request from a client to the API Bridge 10 then to the Target Server. The API Bridge 10 can cross the internet and the API request can change authentication methods. Support of the API Bridge 10 may be available to the client and target server without any code changes. This may include, but is not limited to, the following general steps:

a. Client 14 calls an API resource on the Local API Bridge 18;
b. Local API Bridge 18 receives API request and creates message 22 to be sent to the Remote API Bridge 20;
c. Remote API Bridge 20 receives message 22 and calls target server with API request 24;
d. Target server responds 26 to the request 24 from Remote API Bridge 20;
e. Remote API Bridge 20 creates message 28 with target server's response 26 to send to Local API Bridge 18;
f. Local API Bridge 18 receives message 28 with target server's response 26 from Remote API Bridge 20;
g. Local API Bridge 18 responds 30 to client 14 with content of message 26 from target server 16;

The API Bridge 10 may permit the availability of a Target Server System 16 that would otherwise be unavailable or difficult to secure and make available. When local client system 14 sends an HTTP or HTTPS request to the Local API Bridge 18, the request is packaged and sent via messaging system 32 to Remote API Bridge 20. This message is then interpreted, and a request from the Remote API Bridge 20 is sent to the Target Server System 16. What may make API Bridge 10 unique could be that the original request from the Local Client System 14 to the Local API Bridge 18 may still be waiting a response. That response is from the Target Server System 16. So, when the Target Server System 16 responds to the API request from the Remote API Bridge 20, the response is sent as another message from the Remote API Bridge 20 to the Local API Bridge 18. It is when the Local API Bridge 18 receives this response that it will finally respond to the original request from the Local Client System 14.

In an exemplary embodiment, due to the distributed nature of the API Bridge 10, the authentication method can change from what is used on the Local API Bridge 18 and the Target Server System 16. This may be of interest to enterprises that want SSO (or the like) but are not willing to share the SSO credentials outside of their organization. In this example, the Local API Bridge 18 can use first authentication 34 in the local enterprise, while the Remote API Bridge 20 can use second authentication 36 in the remote enterprise.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. An API bridge device for transporting a local API request from a local client system to a target server system, said API bridge comprising:
   a local API bridge in communication with the local client system; and
   a remote API bridge in communication with the target server system;
   wherein, the local API bridge is configured to receive the local API request from the local client system and create a first message to be sent to the remote API bridge; and
   wherein, the remote API bridge is configured to receive the first message created by the local API bridge and call the target server system with a target API request wherein, when the target server system responds to the target API request from the remote API bridge with a target API response, the remote API bridge is configured to create a second message with the target API response;
   wherein, the local API bridge is configured to receive the second message created by the remote API bridge and respond to the local client system with a local API response;
   wherein the first message created by the local API bridge and the second message created by the remote API bridge are packaged and sent via a messaging system;
   wherein the local client system does not receive a response from the target server system until the local API bridge receives the second message from the remote API bridge;
   wherein the API bridge device is configured to change authentication methods of the local API request;
   wherein the local API bridge is configured to use a first authentication for the local client system, while the remote API bridge is configured to use a second authentication for the target server system;
   wherein the API bridge device is configured for support of the local client system and the target server system without any code changes, wherein the API bridge device is configured with an ability to utilize existing API and protocols of both the local client system and the target server system;
   wherein the API bridge device is configured to support all future requests over HTTP or HTTPS;
   wherein the API bridge device is configured to not interpret content of the HTTP body, and pass the HTTP body without change to the target server system, whereby all future API protocols that use HTTP or HTTPS are supported;
   wherein connectivity between the local API bridge and the remote API bridge is encrypted for security; and
   wherein the API bridge device is configured for allowing the local client system and the server system to use an insecure version of HTTP.

2. The API bridge device according to claim 1, wherein the API bridge device may be installed on the same hardware as the local client system or the target server system.

3. The API bridge device according to claim 1, wherein the API bridge device is configured to cross the internet.

4. The API bridge device according to claim 1, wherein the API bridge device is configured for use with an existing local client system and an existing target server system without any change to code on the existing local client system and the existing target server system.

5. The API bridge device according to claim 1, wherein the API bridge device is configured to permit access to only the target server system with a secure configuration.

6. The API bridge device according to claim 1, wherein the API bridge device is configured to transmit information between different enterprise LANs while offering an ability to change authentication methods;
wherein the API bridge is configured to deploy the local API bridge and the remote API bridge in different enterprises; and
wherein the different enterprises share API resources without using a VPN or exporting the API resource to the internet.

7. The API bridge device according to claim 1, wherein the API bridge device is configured to monitor API calls between the local client system and the target server system to identify when the local client system and the target server system are operating properly, or to identify when there is unwanted activity.

8. The API bridge device according to claim 1, wherein the API bridge device is configured to forward the local API request when both the local API bridge and the remote API bridge are behind at least one firewall without any available open ports.

9. An API bridge device for transporting a local API request from a local client system to a target server system, said API bridge comprising:
a local API bridge in communication with the local client system; and
a remote API bridge in communication with the target server system;
wherein, the local API bridge is configured to receive the local API request from the local client system and create a first message to be sent to the remote API bridge;
wherein, the remote API bridge is configured to receive the first message created by the local API bridge and call the target server system with a target API request;
wherein, when the target server system responds to the target API request from the remote API bridge with a target API response, the remote API bridge is configured to create a second message with the target API response;
wherein, the local API bridge is configured to receive the second message created by the remote API bridge and respond to the local client system with a local API response having content of the target API response;
wherein the first message created by the local API bridge and the second message created by the remote API bridge are packaged and sent via a messaging system;
wherein the local client system does not receive a response from the target server system until the local API bridge receives the second message from the remote API bridge;
wherein the API bridge device is configured to cross the internet;
wherein the API bridge device is configured to change authentication methods of the local API request, wherein the local API bridge is configured to use a first authentication for the local client system, while the remote API bridge is configured to use a second authentication for the target server system;
wherein the API bridge device is configured for support of the local client system and the target server system without any code changes, wherein the API bridge device is configured with an ability to use existing API and protocols of the local client system and the target server system;
wherein the API bridge device is configured to support all future requests over HTTP or HTTPS, wherein the API bridge is configured to not interpret content of the HTTP body, and pass the HTTP body without change to the target server system, whereby all future API protocols that use HTTP or HTTPS are supported;
wherein the API bridge device is configured for use with an existing local client system and an existing target server system without any change to code on the local client system and target server system;
wherein the API bridge device is configured to permit access to only the target server system with a secure configuration;
wherein the API bridge device is configured to transmit information between different enterprise LANs while offering an ability to change authentication methods, wherein the API bridge device is configured to deploy the local API bridge and the remote API bridge in different enterprises, wherein the different enterprises share API resources without using a VPN or exporting the API resource to the internet;
wherein the connectivity between the local API bridge and the remote API bridge is encrypted for security, wherein the API bridge device is configured for allowing the local client system and the server system to use an insecure version of HTTP when the local client system connects to the API bridge device, or when the API bridge device connects to the target server system;
wherein the API bridge device is configured to monitor the API calls between the local client system and the target server system to identify if the local client system and the target server system are operating properly, or to identify if there is unwanted activity; and
wherein the API bridge device is configured to forward the local API request when both the local API bridge and the remote API bridge are behind at least one firewall without any available open ports.

10. A method for transporting a local API request from a local client system to a target server system comprising:
providing an API bridge device comprising:
a local API bridge in communication with the local client system; and
a remote API bridge in communication with the target server system;
receiving the local API request from the local client system via the local API bridge;
creating a first message to be sent to the remote API bridge via the API bridge device;
receiving the first message created by the local API bridge via the remote API bridge; and
calling the target server system with a target API request via the remote API bridge;
wherein the API bridge is configured to change authentication methods of the local API request, wherein the local API bridge is configured to use a first authentication for the local client system, while the remote API bridge is configured to use a second authentication for the target server system;
wherein the API bridge is configured for support of the local client system and the target server system without any code changes, wherein the API bridge is configured with an ability to use existing API and protocols of the local client system and the target server system;

wherein the API bridge is configured to support all future requests over HTTP or HTTPS, wherein the API bridge is configured to not interpret content of the HTTP body, and pass the HTTP body without change to the target server system, whereby all future API protocols that use HTTP or HTTPS are supported; and wherein the connectivity between the local API bridge and the remote API bridge is encrypted for security, wherein the API bridge is configured for allowing the local client system and the target server system to use an insecure version of HTTP when the local client system connects to the API bridge, or when the API bridge connects to the target server system.

11. The method according to claim 10, wherein:

the target server system responding to the target API request from the remote API bridge with a target API response;

creating a second message with the target API response via the remote API bridge;

receiving the second message created by the remote API bridge via the local API bridge; and responding to the local client system with a local API response having content of the target API response via the local API bridge;

wherein, the first message created by the local API bridge and the second message created by the remote API bridge are packaged and sent via a messaging system.

12. The method according to claim 11, wherein the local client system does not receive a response from the target server system until the local API bridge receives the second message from the remote API bridge.

13. The method according to claim 10:

wherein the API bridge is configured to cross the internet;

wherein the API bridge is configured for use with existing local client systems and target server systems without any change to code on the local client system and target server system;

wherein the API bridge is configured to permit access to only the target server system with a secure configuration;

wherein the API bridge is configured to transmit information between different enterprise LANs while offering an ability to change authentication methods, wherein the API bridge is configured to deploy the local API bridge and the remote API bridge in different enterprises, wherein the different enterprises share API resources without using a VPN or exporting the API resource to the internet;

wherein the API bridge is configured to monitor the API calls between the local client system and the target server system to identify when the local client system and the target server system are operating properly, or to identify when there is unwanted activity; and wherein the API bridge is configured to forward the API request when both the local API bridge and the remote API bridge are behind at least one firewall without any available open ports.

* * * * *